Feb. 5, 1924.
N. T. SHORTS
COMBINATION VALVE STEM AND PRESSURE GAUGE
Filed Jan. 6, 1923
1,482,947
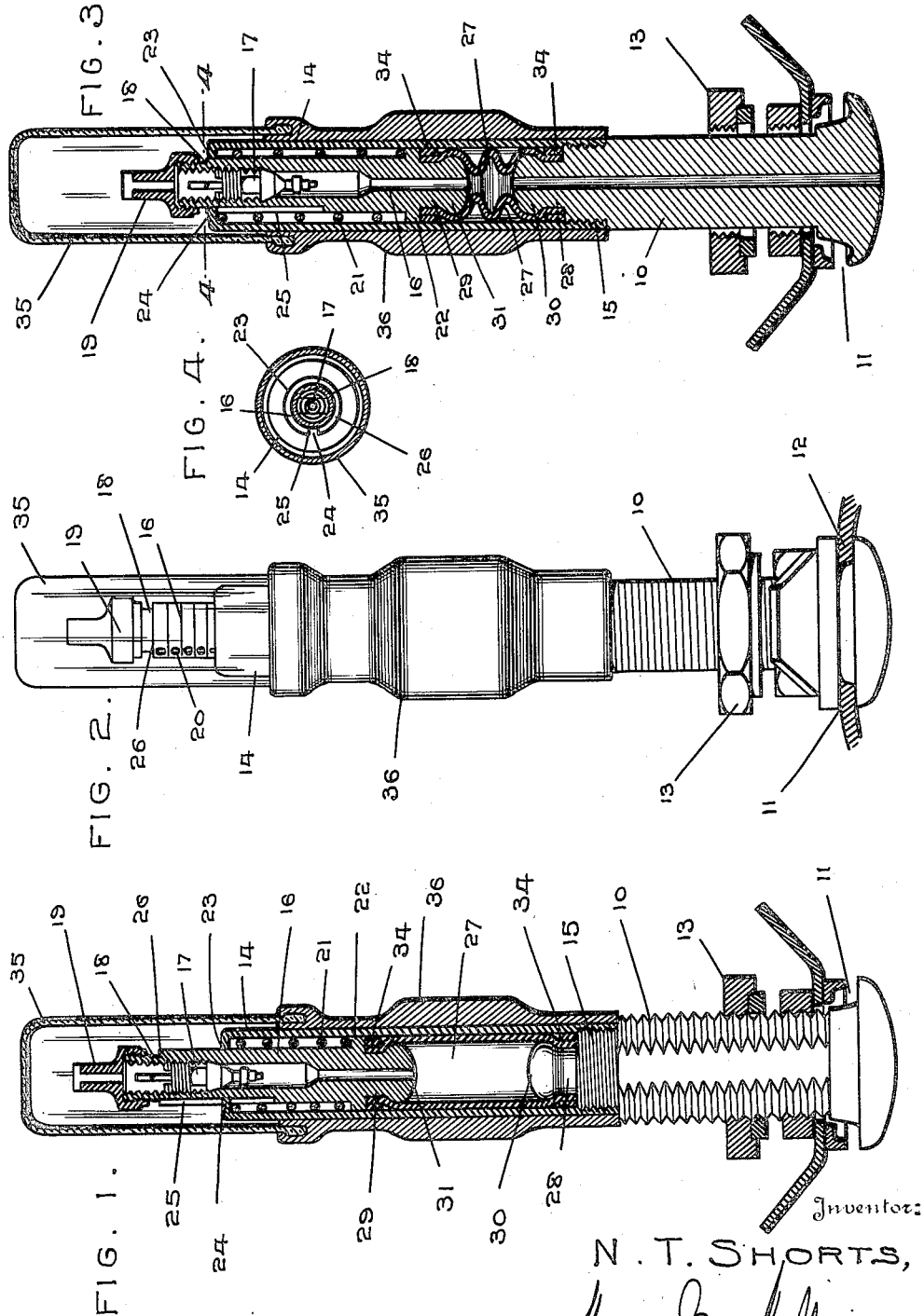
Inventor:
N. T. Shorts,
By Monroe E. Miller
Attorney.

Patented Feb. 5, 1924.

1,482,947

UNITED STATES PATENT OFFICE.

NELSON TALMAGE SHORTS, OF FERN, PENNSYLVANIA.

COMBINATION VALVE STEM AND PRESSURE GAUGE.

Application filed January 6, 1923. Serial No. 611,069.

*To all whom it may concern:*

Be it known that I, NELSON T. SHORTS, a citizen of United States, residing at Fern, in the county of Clarion and State of Pennsylvania, have invented certain new and useful Improvements in a Combination Valve Stem and Pressure Gauge, of which the following is a specification, reference being had therein to the accompanying drawing.

The present invention relates to a combination valve stem and pressure gauge for pneumatic tires, and aims to provide a novel and improved device, which in addition to the usual function of the valve stem for the inflation of the tire, will provide a pressure gauge as a unit therewith, which will constantly indicate the pressure of the air in the tire.

The object of the invention is the provision of such a combination valve stem and pressure gauge comprising a novel construction, arrangement and assembly of the component elements, to render the device practical, efficient and serviceable.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawing, wherein:—

Figure 1 is an elevation of the improved valve stem having the pressure gauge combined therewith.

Fig. 2 is a view showing portions in elevation and portions in longitudinal section.

Fig. 3 is a longitudinal section on the line 3—3 of Fig. 2, showing the plunger retracted.

Fig. 4 is a cross section on the line 4—4 of Fig. 3.

The valve stem comprises three parts or sections, namely, the base or body portion 10 having suitable means 11 for fastening it to the inner tube 12 of a pneumatic tire, a tubular shell or barrel 14 having one end portion screw-threaded or otherwise secured, as at 15, on the end portion of the valve stem body 10 opposite to the end which is secured to the inner tube, and a slidable plunger or section 16 disposed slidably in the shell or barrel 14. A nut 13 is screw-threaded on the body 10 for securing the body to the demountable rim through which said body extends, and the barrel 14 is of sufficiently small diameter to enable another similar nut 13 to readily pass said barrel in applying and removing the tire, when such additional nut is used to bear against the inner periphery of the wheel felly, it being necessary to remove such nut when withdrawing the valve stem from or inserting it through the felly.

The plunger 16, which has a hole or duct longitudinally therethrough communicating with the hole or duct extending longitudinally through the body 10, has the usual valve 17 therein, permitting the air to flow through the stem into the tire but preventing the escape of air unless the valve is manually opened. The plunger has the tip or outer end portion 18 of reduced diameter, on which the usual inner cap 19 is screw-threaded, for closing the end of the stem and excluding dust from the valve 17.

The plunger projects from the barrel 14, and is provided at one side with graduations 20 for indicating the pressure, such graduations being visible beyond the end of the barrel when the plunger is projected or the stem extended.

The plunger 16 is retracted, so as to contract the stem, in the absence of pressure, by means of a coiled spring 21 disposed between the barrel 14 and plunger 16, or within the barrel around the plunger, said spring being confined between a collar or flange 22 on the plunger near the inner end thereof, and an inturned flange 23 with which the outer end of the barrel is formed. The plunger can therefore yield outwardly to project it more or less from the barrel, according to the pressure, the spring resisting the projection of the plunger under compression. The spring also holds the plunger 16 centrally of the barrel, assisted by the collar 22 fitted snugly in the barrel.

In order to prevent the plunger from being rotated relatively to the barrel 14, the flange 23 has a lug or feather 24 extending toward the plunger, and said plunger has a longitudinal groove or featherwat 25 extending inwardly from the shoulder 26 of the plunger formed by the tip or reduced end portion 18. When the plunger is completely retracted by the spring, the shoulder 26 is flush with the flange 23, but by pushing the plunger inwardly the feather 24 is removed from the groove 25. The groove 25 will also limit the projection of the plunger under pressure, to avoid the excessive compression of the spring or motion of the parts.

The plunger operates as a piston in the barrel or cylinder 14, and in order to prevent leakage of air from between the body 10 and plunger an elastic tube 27 is disposed between and secured to the adjacent end portions of said body and plunger. Said adjacent ends of the body and plunger have the respective nipples 28 and 29 over which the ends of the tube are fitted, or other provision can be made for attaching the ends of the tube to the body and plunger. As shown, the nipples 28 and 29 have the respective rounded enlargements 30 and 31, and bands 34 embrace the tube and clamp the end portions thereof on the nipples behind the enlargements. The intermediate portion of the tube 27 bears against the wall of the barrel or shell 14, to prevent the tube being expanded or inflated, although it can be expanded or extended longitudinally. Such tube is composed of soft rubber or other elastic or flexible air proof material, and which preferably offers no appreciable resistance to the movement of the plunger, the tube being under little or no tension when the plunger is fully projected. The tube collapses or folds together in bellows formation, as seen in Fig. 3, when the plunger is retracted and is slightly compressed between the nipples 28 and 29 to hold the collar 22 against the spring 21 and the shoulder 26 flush with the flange 23 in the absence of pressure.

An outer cap for the stem is provided, to exclude dirt and foreign matter from the interior of the barrel or shell 14. This outer cap comprises the cap 35 of glass or other transparent material, having its open end or rim secured to a sleeve 36 of rubber or similar material, whereby the sleeve can be slipped on the barrel 14 to retain the cap on the stem by friction, and permitting the cap to be readily applied and removed. The transparent cap 35 enables the plunger to be seen for reading the pressure of the tire without removing the cap.

The tire is readily inflated by removing the outer and inner caps, and attaching the pump or air compressor hose to the tip or outer end portion 18 of the plunger, the check valve 17 preventing the reverse flow of air from the tire in the usual way. The greater the air pressure in the tire, the more will the plunger 16 be forced outwardly by the pressure of air against the yielding plunger, the tube 27 being provided to assure that no air will escape from between the body 10 of the stem and the plunger.

The parts of the stem and gage can be separated and assembled without removing the stem from the inner tube, and also while the tire is on the wheel, inasmuch as the barrel or shell 14 can be unscrewed or detached from the body 10 of the stem, to expose the plunger spring and tube. It will be noted that when the barrel 14 is being removed or applied, with the plunger fully retracted, the lug or feather 24 is removed from the groove 25 of the plunger by pushing the plunger inwardly to space the shoulder 26 inwardly from the flange 23, thereby permitting the barrel to rotate without turning the plunger, and when the barrel 14 is in place and the plunger released the tube 27 has sufficient expansion (being compressed when the plunger is pushed inwardly) to bring the shoulder 27 flush again with the flange 23 and engaging the feather or lug 24 in the groove 25 to prevent the plunger from turning, thereby keeping the plunger in its proper angular position. The assembly of the component elements is therefore of advantage to permit of ready access to the several parts for purpose of cleaning, repair or adjustment, and the compressible spring 21 provides an efficient movement of the plunger in proportion to the air pressure, without being materially affected by the tube 27. The spring alone controls the yielding movement of the plunger, so that the aging of the tube 27 will not result in the pressure indications being wrong or inaccurate.

Having thus described the invention, what is claimed as new is:—

1. A combination valve stem and pressure gauge comprising a valve stem body, a barrel having one end portion screw-threaded on the body, a pressure indicating plunger slidable in the barrel and projectable therefrom, a connection between said plunger and body and an air valve in the plunger, the other end of the barrel and the plunger having portions to engage for preventing the relative turning movement of the plunger and barrel and adapted to be disengaged by forcing the plunger into the barrel, to permit the barrel to rotate.

2. A combination valve stem and pressure gauge comprising a valve stem body, a barrel having one end screw-threaded on the body and having an inturned flange at its opposite end, a pressure indicating plunger slidable in the barrel and projectable from the last named end thereof, an air valve in the plunger, and a spring between the barrel and plunger confined between said flange and a portion of the plunger, said flange having a feather, the plunger having a longitudinal groove to engage said feather, said feather being removed from said groove by forcing the plunger into the barrel.

In testimony whereof I hereunto affix my signature.

NELSON TALMAGE SHORTS.